United States Patent
Alanara

(10) Patent No.: US 8,422,373 B2
(45) Date of Patent: Apr. 16, 2013

(54) ADAPTIVE MULTI-RATE CODEC BIT RATE CONTROL IN A WIRELESS SYSTEM

(75) Inventor: Seppo Matias Alanara, Oulu (FI)

(73) Assignee: Nokia Corporation, Espoo (FI)

(*) Notice: Subject to any disclaimer, the term of this patent is extended or adjusted under 35 U.S.C. 154(b) by 356 days.

(21) Appl. No.: 12/863,480

(22) PCT Filed: Jan. 9, 2009

(86) PCT No.: PCT/IB2009/050091
§ 371 (c)(1),
(2), (4) Date: Jul. 19, 2010

(87) PCT Pub. No.: WO2009/090582
PCT Pub. Date: Jul. 23, 2009

(65) Prior Publication Data
US 2010/0284278 A1    Nov. 11, 2010

Related U.S. Application Data

(60) Provisional application No. 61/011,539, filed on Jan. 17, 2008.

(51) Int. Cl.
*G01R 31/08* (2006.01)
*H04Q 7/20* (2006.01)

(52) U.S. Cl.
USPC ......... 370/235; 370/230; 455/453; 455/452.2

(58) Field of Classification Search .......... 370/229–236; 455/452.2–453
See application file for complete search history.

(56) References Cited

U.S. PATENT DOCUMENTS

| | | | |
|---|---|---|---|
| 2002/0186657 A1 | 12/2002 | Jain et al. | |
| 2005/0107091 A1* | 5/2005 | Vannithamby et al. | ....... 455/453 |

FOREIGN PATENT DOCUMENTS

| | | | |
|---|---|---|---|
| EP | 1739989 A | 1/2007 | |
| WO | 0163898 A | 8/2001 | |
| WO | 2006075951 A | 7/2006 | |
| WO | 2007121163 A | 10/2007 | |

OTHER PUBLICATIONS

International Search Report and Written Opinion of the International Searching Authority for PCT Application No. PCT/IB2009/050091, dated May 19, 2009, 13 pages.
Alcatel-Lucent, "Rate Control for CS voice service over HSPA", 3GPP Draft, R2-080369, Jan. 7, 2008.
3GPP TS 26.103 v7.0.0 (Jun. 2007) entitled Technical Specification Group Services and Systems Aspects; Speech Codec List for GSM and UMTS; (Release 7) (19 pages).
"Rtp Payload Format and File Storage Format for AMR and AMR-WB Audio Codecs", by J. Sjoberg et al. and designated Network Working Group RFC 3267 (Jun. 2002) (14 pages).

* cited by examiner

*Primary Examiner* — Afsar Qureshi
(74) *Attorney, Agent, or Firm* — Harrington & Smith

(57) ABSTRACT

In an exemplary embodiment a method includes monitoring traffic in one or more cells; determining that the traffic in one of the cells is congested; and responsive to the determining, initiating a rate change for at least one ongoing connection within the cell. Apparatus and computer programs are also determined for both a user equipment and a network node.

20 Claims, 7 Drawing Sheets

ADAPTIVE MULTI-RATE CODEC BIT RATE CONTROL IN A WIRELESS SYSTEM

RELATED APPLICATION

This application was originally filed as PCT Application No. PCT/IB2009/050091 on Jan. 9, 2009 and claims priority to U.S. Provisional Application No. 61/011,539 filed on Jan. 17, 2008, which is incorporated herein by reference in its entirety.

TECHNICAL FIELD

The teachings herein relate generally to IP based cellular wireless networks, such as LTE using UDP (or TCP) IP packets in the User Plane traffic.

BACKGROUND

The following abbreviations are used in the description below:
  3GPP third generation partnership project
  AMR adaptive multi-rate
  BER/BLER bit error rate/block error rate
  CMR codec mode request
  CN core network
  DL downlink
  DTX discontinuous transmission
  e-NodeB E-UTRAN Node B (base station or other access node) of an LTE
  E-UTRAN evolved UTRAN (also known as LTE or 3.9G or SAE)
  GERAN GSM EDGE radio access network
  HARQ hybrid automatic repeat request
  HSPA high speed packet access
  IP Internet Protocol
  LA location area
  LTE long term evolution of 3GPP
  MGW mobility gateway
  PCM pulse code modulation
  PCRF policy and charging rules function
  PDCP packet data control protocol
  RAB radio access bearer
  RRC radio resource control
  RTP real-time transport protocol
  SID silence descriptor
  TFO tandem free operation
  TrFO transcoder free operation
  UE user equipment (e.g., mobile equipment/station)
  UL uplink
  UMA unlicensed mobile access (also generic access network GAN)
  UMTS universal mobile telecommunications system
  UTRAN UMTS terrestrial radio access network (also known as 3G)
  VoIP voice over Internet protocol
  WB wideband
  WCDMA wideband code division multiple access
  WLAN wireless local area network 3GPP is standardizing the long-term evolution (LTE) of the radio-access technology which aims to achieve reduced latency, higher user data rates, improved system capacity and coverage, and reduced cost for the operator as compared to legacy systems. LTE is a fundamental redesign of UTRAN (3G) employing IP packet transmission and as such many of the particular implementations in UTRAN are not directly transferable to E-UTRAN. One such implementation relevant to these teachings is the adaptation of AMR codec bit rate control, to optimize the payload size in RTP packets so as to better use the limited radio resources available to the system. The legacy implementations of AMR rate adaptation is alternately implemented by link quality (in GSM/GERAN) or by radio network controller RNC bearer control (in WCDMA/UTRAN). First are detailed some prior art implementations of AMR codec bit rate control.

Slow rate control is used in the global system for mobile telecommunications (GSM) system. Cellular operators often will apply a change between half rate and full rate coding at certain predetermined times of the day in order to gain cell capacity. This interfaces with common restrictions on users, for example where a subscriber agreement allows for a flat rate monthly fee subscribers to use a certain number of minutes during peak traffic periods (e.g., between 7 AM and 8 PM) and a higher number of minutes during off-peak periods. The operator will impose the half-rate during the peak periods to handle a greater volume of traffic and the full rate during the off-peak period to provide a higher connection quality when the radio resources are expected to be less in demand. For the case where there is an ongoing call during the rate changeover, typically the channel rate change is carried out by an intra-cell channel mode handover.

AMR link adaptation controlling AMR bit rates is used in GSM (GERAN). The GERAN radio interface does not support fast power control, but link adaptation is done using inband CMR signaling. The worst radio link (caller or callee) controls the bit rate for a voice call. A set of four modes from eight possible modes is controlled by the two bits using inband signaling. There is a 40 ms minimum delay between the mode changes. The base station controller BSC (functionally equivalent to a radio network controller RNC in the UTRAN system) serves as the master for changes, while the UE and TRAU (transcoder/rate adaptation unit) work as slaves for it.

AMR is also used in WCDMA systems. To gain coverage, cell capacity or to statistically lower the packet-based transport radio and core network load, a selected set of rates (from 1 to N) can be given to the transcoder or to the UE or to both (where UL and DL rates are controlled separately). This can be controlled during RAB establishment by providing the set of permitted rates to the UE (for UL rate control) and to the transcoder (for DL rate control and initialization) that the rate control function will be using. So in WCDMA the RNC controls the overall AMR bit rates and thus the capacity of cells under the RNC's control. In WCDMA the transcoder is not part of the wireless system as in UTRAN, but part of the core network CN. Thus the CN can include or exclude the transcoder from the call path based on service criteria. What is termed transcoder free operation (TrFO) is therefore possible, which gives the associated benefits such as reduced transmission costs, higher speech quality in UE-UE calls, and reduced transcoder resources, for example.

In UTRAN the AMR bit rate control in the air interface is implemented by use of transport formats of the associated RAB. Restrictions for the operation of the AMR in UTRAN are not the same as in GSM: all eight rates (and discontinuous transmission DTX, where the UE 'sleeps' in a reduced power mode) can be within the configuration (i.e. the active codec set), and the rate can theoretically change at any time between all eight rates or the UE can enter the DTX mode using SID frames (e.g., frames containing only comfort noise parameters). However, in the case of TFO-TrFO interoperation between UTRAN and GERAN systems, up to four AMR modes plus SID are allowed on the UTRAN side. Inband CMR signaling from the GERAN is converted to rate control messages towards the UTRAN in the MGW to enable the LA function in the 3G-to-GSM direction. For a proper LA operation in the GSM-to-3G direction, the UTRAN must follow the 40 ms delay rule of the GSM LA while doing rate control towards the GSM system.

One relevant standard in that regard is 3GPP TS 26.103 v7.0.0 (2007-06) entitled TECHNICAL SPECIFICATION GROUP SERVICES AND SYSTEMS ASPECTS; SPEECH CODEC LIST FOR GSM AND UMTS; (Release 7). That reference discloses that the active codec mode is selected from the active codec set (ACS) by the network. This codec mode adaptation, also termed rate control, can be performed for the UMTS AMR-WB every 20 ms for the downlink traffic channel, but only every 40 ms for the uplink traffic channel by going to another codec mode within the ACS. The UE selects at call setup one of the two possible phases for codec mode adaptation (odd or even frames). During the call, changes of the codec mode in the uplink direction are only allowed in this selected phase. Rate control commands received in the downlink direction are considered at the next possible phase. By this definition, the UMTS AMR-WB codec type is TFO and TrFO compatible to the full rate FR AMR-WB, the optimized half rate OHR AMR-WB and optimized full rate OFR AMR-WB and the UMTS AMR-WB codec types.

The codec modes in uplink and downlink at one radio leg may be different. In tandem free operation or transcoder free operation, both radio legs (uplink A and downlink B) are considered for the optimal selection of the active codec mode in each direction (uplink A and then downlink B, respectively vice versa) by a "Distributed Rate Decision" algorithm. The worst of both radio legs determine the highest allowed codec mode, respectively the maximally allowed rate. All rate control commands are transmitted inband on the Iu and Nb interfaces and out-of-band on the radio interface.

The active codec set is selected at call setup or reselected during the call. It consists of three or four codec modes at a given time, selected from the allowed configurations. The selection of the configuration may be constrained by the network to consider resources and radio conditions. The active codec sets in uplink and downlink are typically identical.

Power is an important radio resource in a WCDMA system, and different AMR modes require different amounts of transmission power. The WCDMA air-interface has an in-built link quality control system that includes fast power control and some kind of quality based outer loop power control. The link quality control ensures that sufficient quality is maintained for each radio link. The quality target will be met even under difficult propagation conditions but at a cost of high transmission power. Instead, the selection of mode is based on the loading level in the system. There is no need for adapting the AMR modes to handle link quality variations like in a GSM system and on the power consumption of individual radio links. Thus, the admission control and rate control algorithms within the radio network generally govern AMR mode changes.

In the case of HSPA VoIP, cellular network based rate control is exercised. The CMR bits are however utilized as defined in the RTP specification, but the network has no control over it.

In UMA there is AMR VoIP rate control, but in that case, the rate is only matched with the AMR rate in the GERAN cell i.e., there is no local rate control in UMA but the far end connection will decide the active AMR rate. Additionally, the need for rate control depends on whether the network implements the transcoding into PCM. If AMR is not transcoded and is instead sent through an adaptation layer implemented in the media gateway, both ends of the VoIP path are following the AMR rate of the GERAN radio frequency RF link. The WLAN link and the UMA terminal merely adjust to the RTP header AMR bit rate information.

RTP AMR frame header supports the CMR signaling. Unlike GSM, there are no limitations for minimum period between rate changes and there is no subset of AMR rates used in the control process.

In LTE all transmission is packet oriented, and therefore the radio interface protocol layers do not recognize specific packets as AMR. The radio interface uses adaptive coding and HARQ mechanisms to ensure the required BER or BLER. As smaller packets improve the link BLER, it would be advantageous to include AMR bit rate control also to LTE as it is also supported by the RTP header. The biggest gain to the LTE comes however from lowering the overall AMR bit rates, as this enables more active VOIP calls supported in an LTE cell. The need for bit rate control arises when the load is increased to the level of cell capacity. In LTE there is no mechanism for AMR rate control to handle high voice call traffic situations and enabling the cell to serve more VOIP users. Note that in addition to get higher overall capacity to LTE, it is possible to improve BLER of terminals experiencing bad radio conditions prior to the handover. When the E-NodeB measurements indicate worse conditions, the change of AMR rate for the terminal will improve BLER and improve voice quality. The teachings below detail a way of implementing AMR bit rate control in a manner that is compatible with LTE.

SUMMARY

According to an exemplary embodiment there is a method which includes monitoring traffic in one or more cells; determining that the traffic in one of the cells is congested; and responsive to the determining, initiating a rate change for at least one ongoing connection within the cell.

According to another exemplary embodiment there is an apparatus that includes a processor configured to determine that monitored traffic in a cell is congested; and responsive to the determining to initiate a rate change for at least one ongoing connection within the cell.

According to another exemplary embodiment there is an apparatus that includes means for determining that monitored traffic in a cell is congested; and means for responsive to the determining, for initiating a rate change for at least one ongoing connection within the cell. In an embodiment, the means for determining comprises a processor and the means for initiating comprises a transmitter.

According to another exemplary embodiment there is a memory embodying a program of machine-readable instructions, executable by a digital data processor, to perform actions directed to initiating a rate change, the actions that includes: monitoring traffic in one or more cells; determining that the traffic in one of the cells is congested; and responsive to the determining, initiating a rate change for at least one ongoing connection within the cell.

DETAILED DESCRIPTION

Embodiments of this invention provide a solution for implementing AMR bit rate control in a manner consistent with the LTE system. In particular, embodiments of this invention initiate and implement AMR rate changes at the e-NodeB (or similar network access node), where one control element within the e-NodeB monitors VoIP traffic in its cell and determines when the cell is experiencing congestion using PCRF provided control/priority information (e.g., a rate control parameter message). At that point, the control element of the e-NodeB configures the PDCP to downgrade the bit rate for all of the VoIP bearers in its cell. These bearers are changed while their call is ongoing. Unlike certain legacy systems, this bearer change can occur without regard to time of day or cell handover. Further, once the e-NodeB determines that the congestion condition has reversed, it is an automatic condition that all of the bearers return to the rate they used prior to the rate reduction noted above. To avoid a ping-pong effect where the rate reduction causes a no-congestion condition which then reverts to a congestion condition that causes another rate reduction ad infinitum, hysteresis is used. In effect, the threshold for determining congestion is higher than the threshold for determining no congestion, and so there will always be a bit of excess capacity once the system reverts to the no-congestion condition.

While the particular embodiments detailed below are in the context of LTE, the invention is not so limited. The e-NodeB given in the examples represents any access node for a wireless network.

Figure 1:
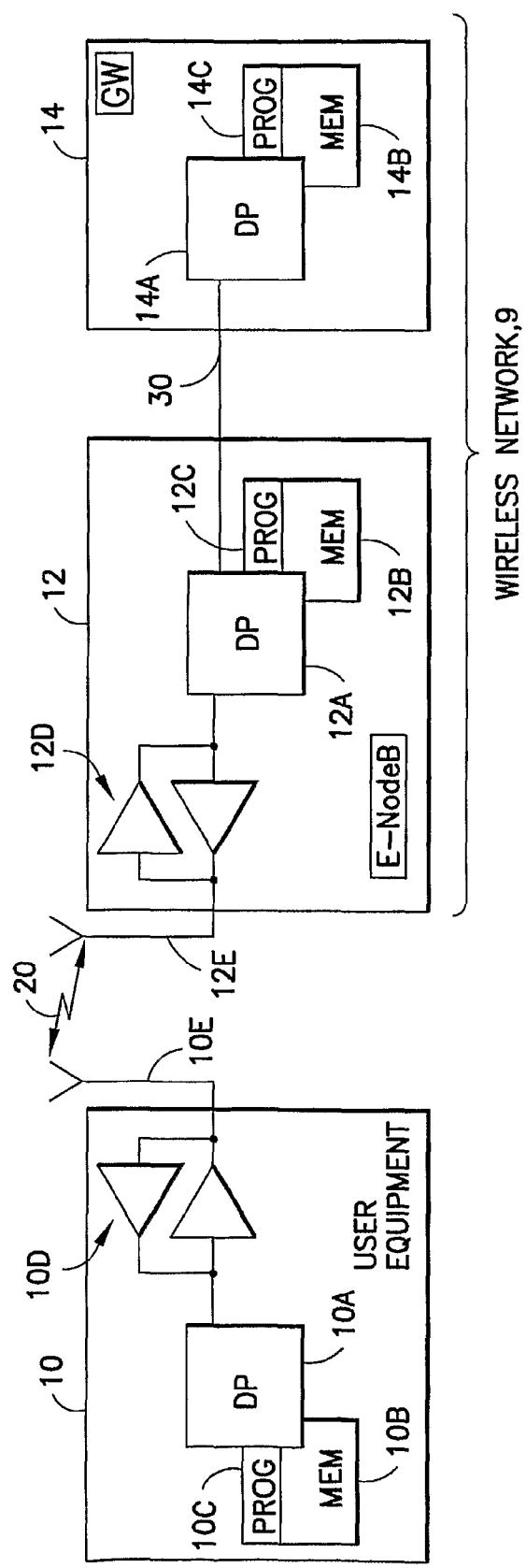
FIG. 1 shows a simplified block diagram of various electronic devices that are suitable for use in practicing the exemplary embodiments of this invention.

As a preliminary matter before exploring details of various implementations, reference is made to FIG. 1 for illustrating a simplified block diagram of various electronic devices that are suitable for use in practicing the exemplary embodiments of this invention. In FIG. 1 a wireless network 9 is adapted for communication between a UE 10 and a e-Node B 12 (e.g., a wireless access node, such as a base station or particularly an e-Node B for a LTE system). The network 9 may include a mobile gateway GW/serving mobility entity MME 14, e-NodeB, or other radio controller function known by various terms in different wireless communication systems. The UE 10 includes a data processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 20 with the e-Node B 12. Further there may be hardwired links between the e-NodeB 12 and other e-NodeB's. The wireless links 20 represent in the particular embodiments described may be any of various channels including for example physical downlink shared channel PUSCH and physical uplink shared channel PUSCH over which VoIP packets are sent in the LTE system. For the case of multiple input/multiple output transmissions, either or both of the UE 10 and the e-NodeB 12 may use one or more antennas 10E, 12E for the links 20.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The e-NodeB 12 also includes a DP 12A, a MEM 12B, that stores a PROG 12C, and a suitable RF transceiver 12D coupled to one or more antennas 12E which interface to the transceiver 12D via respective antenna ports. The e-NodeB 12 may be coupled via a data path 30 (S1 interface) to the serving or other GW/MME. The GW/MME includes a DP 14A, a MEM 14B that stores a PROG 14C, and a suitable modem and/or transceiver (not shown) for communication with the e-Node B 12 over the Iub link 30.

At least one of the PROGs 10C, 12C and 14C is assumed to include program instructions that, when executed by the associated DP, enable the electronic device to operate in accordance with the exemplary embodiments of this invention, as detailed above. Inherent in the DPs 10A, 12A, and 14A is a clock to enable synchronism among the various apparatus for transmissions and receptions within the appropriate time intervals and slots required. The transceivers 10D, 12D include both transmitter and receiver, and inherent in each is a modulator/demodulator commonly known as a modem. The DPs 12A, 14A also are assumed to each include a modem to facilitate communication over the (hardwire) link 30 between the e-NodeB 12 and the GW 14.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the e-NodeB 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figure 2A:
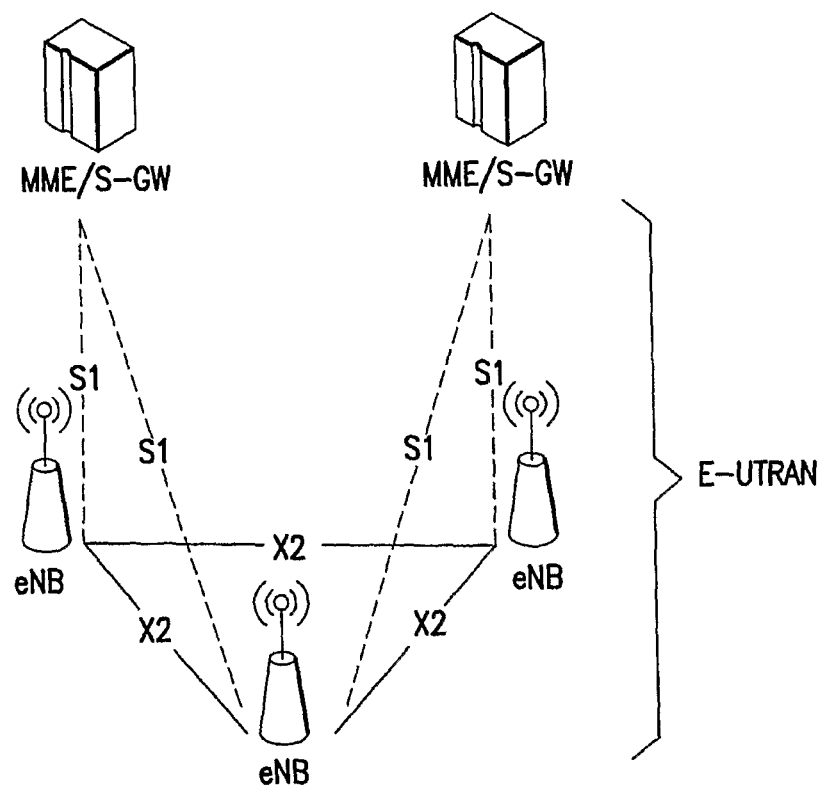
FIG. 2A is a schematic diagram of overall network architecture in LTE.

Now are described the context of a particular embodiment of the invention in detail. As can be seen at FIG. 2A, there is an x2 connection through which the e-NodeBs (eNB) communicate with one another, and each e-NodeB is connected to its mobility management entity MME through a S1 interface. The E-UTRAN system includes the e-NodeB's and their communication connections; the UEs are generally not considered part of the wireless network itself but simply access the network.

Figure 2B:
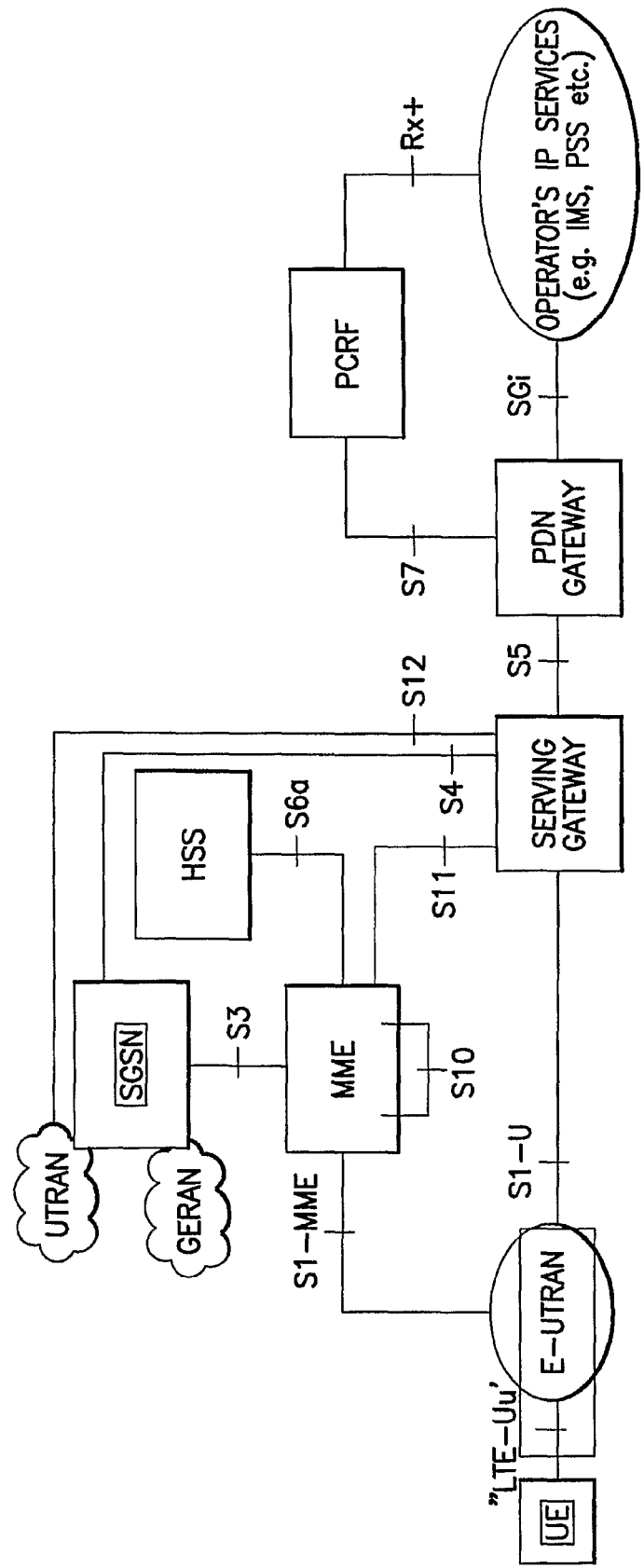
FIG. 2B is a schematic diagram showing a detailed view of LTE architecture.

At FIG. 2B is seen the UE/mobile station with a communication link to the E-UTRAN network (e.g., the e-NodeB) which is in communication with the MME and a serving gateway. The UE triggers initial attachment which implicitly triggers the default bearer establishment in the core network, it negotiates applications quality of service QoS with application function AF (for example a function that hosts the service logic and communicates the application-level session information to the policy and changing functions) for reception services, it maps service data flows SDFs (for example an aggregate set of packet flows that matches a service data flow template) to UL radio bearers based on the UL transport flow template TFT signaled during bearer establishment, it enforces the guaranteed bit rate GBR, maximum bit rate MBR (for example a bit rate that can be used to make code reservations in the downlink of the radio interface) and prioritized bit rate PBR (used for example by the UE for the logical channel prioritization) per bearer, and it reports pending UL data per radio bearer QoS to the e-NodeB to get permission to send data.

The e-NodeB verifies availability and allocates radio bearers and radio bearer QoS at bearer establishment (and modification) based on address resolution protocol allocation and retention priority ARP (used for example for deciding whether a bearer establishment/modification request can be accepted or needs to be rejected in case of resource limitations) and other QoS parameters [e.g., label, GBR/non-GBR, aggregate maximum bit rate AMBR (for example for multiple EPS bearers of the same packet data network PDN connection which can share the same AMBR)], it maps QoS parameters (e.g., label) to local configurations and sets differentiated services code point DSCP towards the SAE GW accordingly, it ensures GBR for UL and DL on the bearer level and maximum AMBR on the subscriber level, and it controls data delivery over the air interface based on radio bearer QoS and received user data from the SAE GW and the UE's reports on UL data waiting to be sent. The MME manages mobility, UE identities and security parameters. Generally the MME functions for non-access stratum NAS signaling and related security, inter CN node signaling for mobility between 3GPP access networks (terminating S3), idle mode UE tracking and reachability (including control and execution of paging retransmission), roaming (terminating S6a towards home subscriber services HSS), authentication and some bearer management functions including dedicated bearer establishment. More specifically, at initial attachment the MME triggers the default bearer establishment and fetches the subscriber's QoS data from the HSS (e.g., access point names APNs, address resolution protocol ARP and AMBR) and selects the SAE GW and provides them to the SAE GW and the e-NodeB, participates in additional bearer establishment and modifications, and at inter-access handovers it maps the QoS between 3GPP accesses.

The serving gateway GW is the node that terminates the interface towards the LTE system. More specifically, the serving GW executes the policy changing enforcement function PCEF (for example, provides transfer to QoS policy and changing rules from PCRF to PCEF through S7 in the LTE/SAE gateway) at bearer establishment and modification, it maps QoS decision (e.g., label) to local configurations accordingly in UL and DL for user packets, it verifies that QoS decisions are allowed by the HSS information and local configurations and current resource availability in the core network, it maps and aggregates new service flows to existing bearers or initiates new bearers if needed (if a non-GBR or GBR bearer exists within the needed label, a new service flow is aggregated to it; if not a new bearer is set up for the flow), it ensures GBR for UL and DL on the bearer level and AMBR on the subscriber level, it maps QoS between non-3GPP accesses and 3GPP accesses at inter-access handovers, and it participates in bearer QoS negotiations using local configurations (e.g., roaming agreements) and the resource situation. For each UE associated with LTE, at a given point of time, there is one single serving gateway. Generally the functions of the serving GW are to serve as a local mobility anchor point for inter-eNodeB handover, mobility anchoring for inter-3GPP mobility (terminating S4 and relaying the traffic between 2G/3G system and PDN Gateway, sometimes referred to as the 3GPP Anchor function), E-UTRAN idle mode downlink packet buffering and initiation of network triggered service request procedure, lawful interception and packet routing and forwarding.

The packet data network PDN gateway is the node that terminates the SGi interface towards the PDN. If a UE is accessing multiple PDNs, there may be more than one PDN GW for that UE. The PDN GW operates as a mobility anchor for mobility between 3GPP access systems and non-3GPP access systems (sometimes referred to as the SAE Anchor function), as a policy enforcement point, as a per-user based packet filter (by e.g. deep packet inspection), and UE IP address allocation (among some other less relevant functions). The PCRF is a policy and charging rules function that provides control parameters for the element in the e-NodeB which controls the VoIP call AMR bit rates. This element controls the PDCP and defines which rate the PDCP will implement to the controlled VoIP Radio Bearers. The PCRF sets the QoS bit decision at bearer establishment and modification on the service flow level for receive and transmit services only. Note that the actual rate change is done by the codecs in the terminal and possibly also in the Media Gateway adapting the VoIP to a wireline terminal. The HSS provides the subscriber's static QoS information at initial bearer establishment, and the AF negotiates application level QoS parameters with the UE and provides them to the PCRF The serving GPRS (general packet radio service) support node SGSN is responsible for the delivery of data packets from and to the mobile stations within its geographical service area. Its tasks include packet routing and transfer, mobility management (attach/detach and location management), logical link management, and authentication and charging functions. The location register of the SGSN stores location information (e.g., current cell, current visitor location register VLR) and user profiles (e.g., unique identifier IMSI, address (es)) used in the packet data network of all GPRS users registered with this SGSN. The SGSN is the interface between the LTE system and other wireless systems such as GERAN and UTRAN shown at FIG. 2B. Whereas the SGSN links to other networks, the HSS links back to the UE's home subscriber service.

Understanding the physical LTE system layout, now a bit of the functional relations are detailed. The E-UTRAN protocol finds the e-NodeBs providing the E-UTRA user plane (PDCP/radio link control RLC/medium access control MAC/physical PHY) and control plane (radio resource control RRC) protocol terminations towards the UE. The e-Node Bs are interconnected with each other by means of the X2 interface. The e-NodeBs are also connected by means of the S1 interface to the EPC (evolved packet core), more specifically to the MME (Mobility Management Entity) by means of the S1-MME (S1-C, control plane) and to the Serving Gateway (S-GW) by means of the S1-U (user plane). The S1 interface supports a many-to-many relation between MMEs/Serving Gateways and e-NodeBs.

The most suited element in the e-NodeB implementing AMR rate control in LTE is PDCP as all necessary information of RTP headers for controlling bearers is already present in PDCP. These teachings generally refer to the e-NodeB implementation of AMR rate control, but do not restrict adding a new protocol layer to implement the rate control. PDCP is already controlling the header compression (e.g. robust header compression ROHC or some new header compression method) and thus must have the information of VoIP bearers and as it compresses the RTP header it also is aware of the RTP header structure at some level.

The PDCP Cell VoIP congestion control messages according to these teachings are sent inside the e-NodeB and the specific interface over which they are sent would be implementation specific.

The radio resource management RRM function in the e-NodeB monitors the traffic in one or more LTE cells (base stations are usually operating on sectors of the base station site). Whenever VoIP traffic in any cell becomes congested and there is need to get more VoIP users to share the cell packet resources, the RRM sends a request message either directly to the PDCP or uses some API (Application Programming Interface) of the PDCP protocol. The message may be in one implementation a request to downgrade the bit rate of all VoIP bearer's belonging to the congested cell, or it may in another implementation additionally specify the bit rate that should be used in all of the VoIP connections in the cell. When the congestion state disappears, the bit rates of VoIP bearers are restored to the original. The control system must however allow some hysteresis, so that there is no ping pong effect on AMR rates changing all the time as noted above. Hysteresis can be done so that when the change is applied, there needs to be some level of spare capacity before the bit rates are changed higher. In another embodiment there is a pre-determined time delay before which the lower bit rate may not be re-applied once the original bit rate is re-established. The capacity measure is more efficient of radio resources whereas the timing delay is a simple method.

This is seen as a wholly new concept to implement VoIP bit rate control in a radio access node such as an e-Node B in LTE. In GERAN and UTRAN the implementation is for circuit switched calls, but in LTE there is a need for a new kind of implementation and the teachings above are seen as fully consistent with other aspects of LTE. Currently, there is no AMR rate control available or proposed in the LTE VoiP case. The bit rate is negotiated at the beginning of the call through IMS (Internet-protocol multimedia subsystem) call control signaling. Simply adapting the IMS VoIP call control so as to be controlled by the PCRF based on the congestion in the system is however very slow as it would only be applied to the calls after the congestion has been detected. Whereas implementations of these teachings in the new concept is controlling ALL present voice calls in the cell/sector, and is thus optimized at the e-NodeB level.

Figure 3:
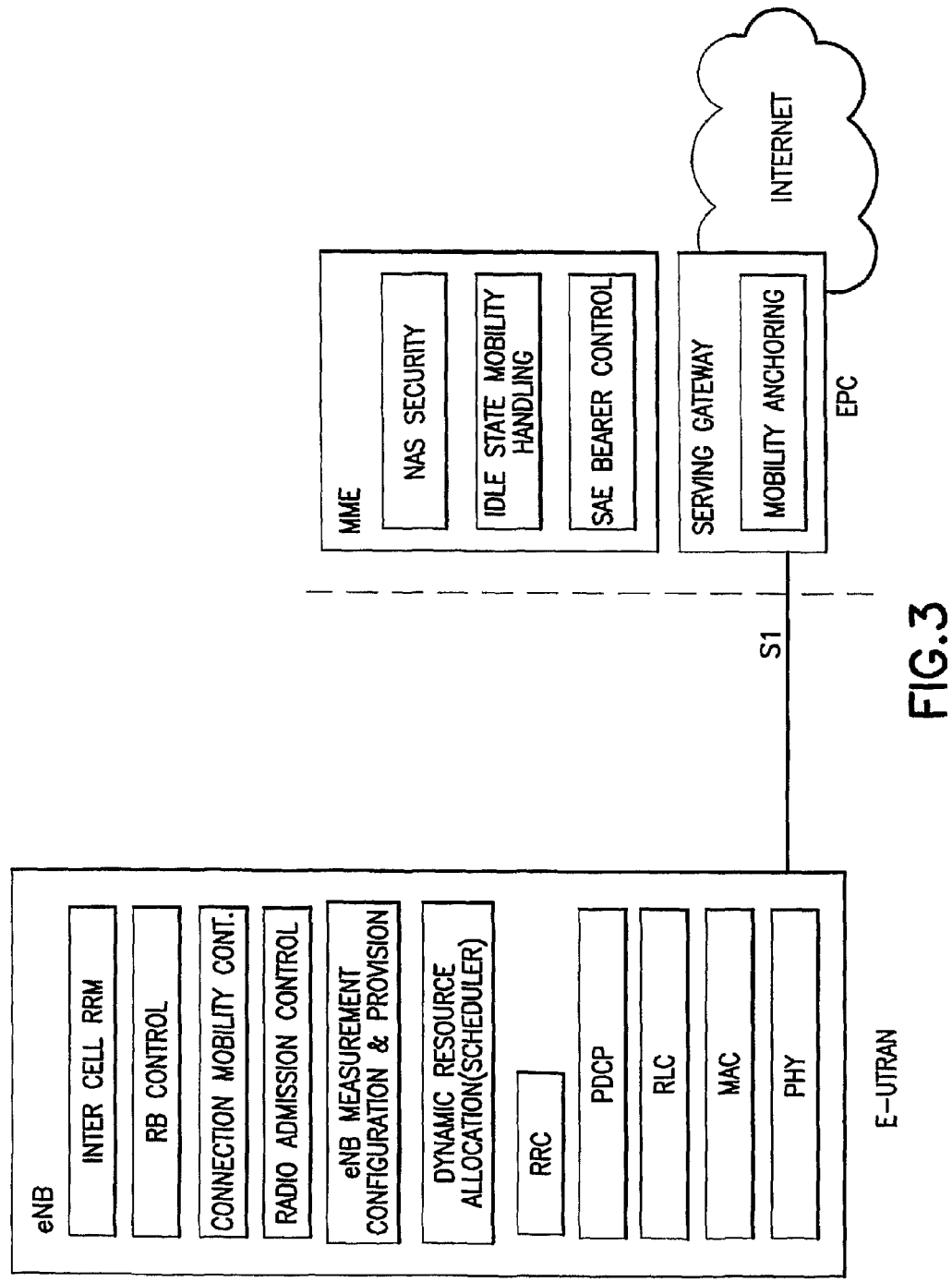
FIG. 3 is a logic level diagram showing functional divisions between LTE and EPC.
Figure 4:
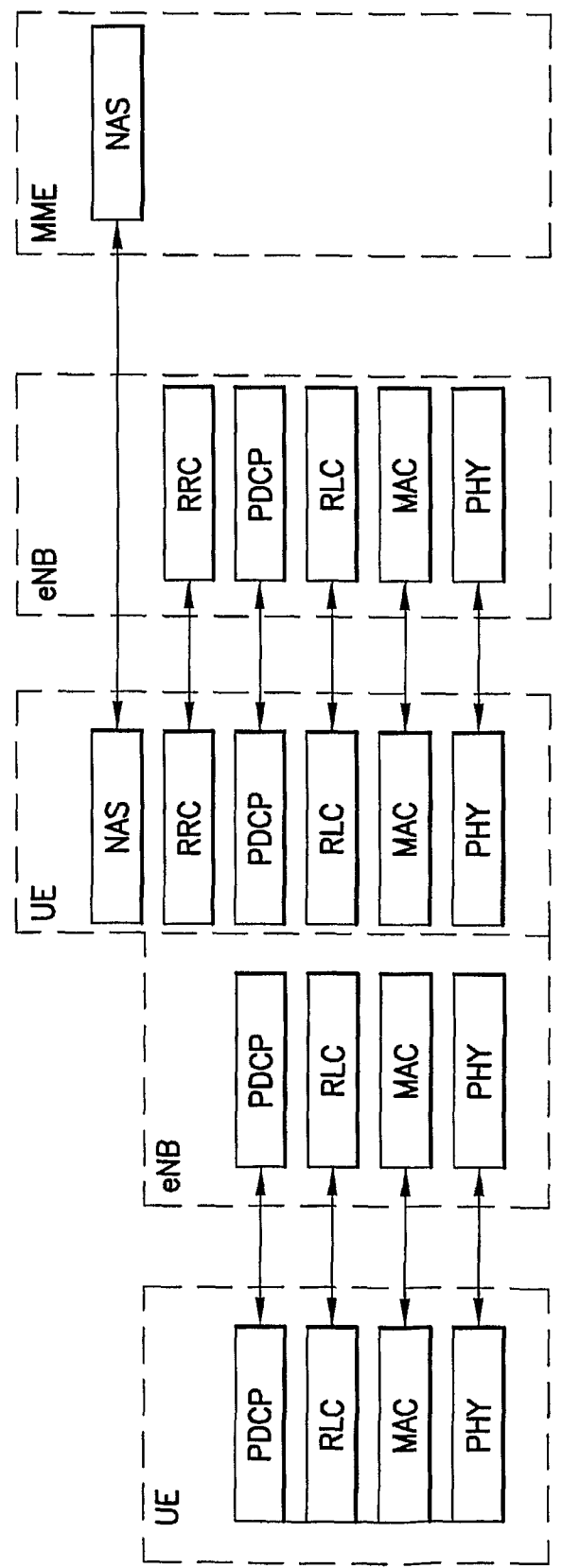
FIG. 4 is a diagram of LTE protocol layers and architecture for a user plane (left side) and control plane (right side, shaded).
Figure 5:
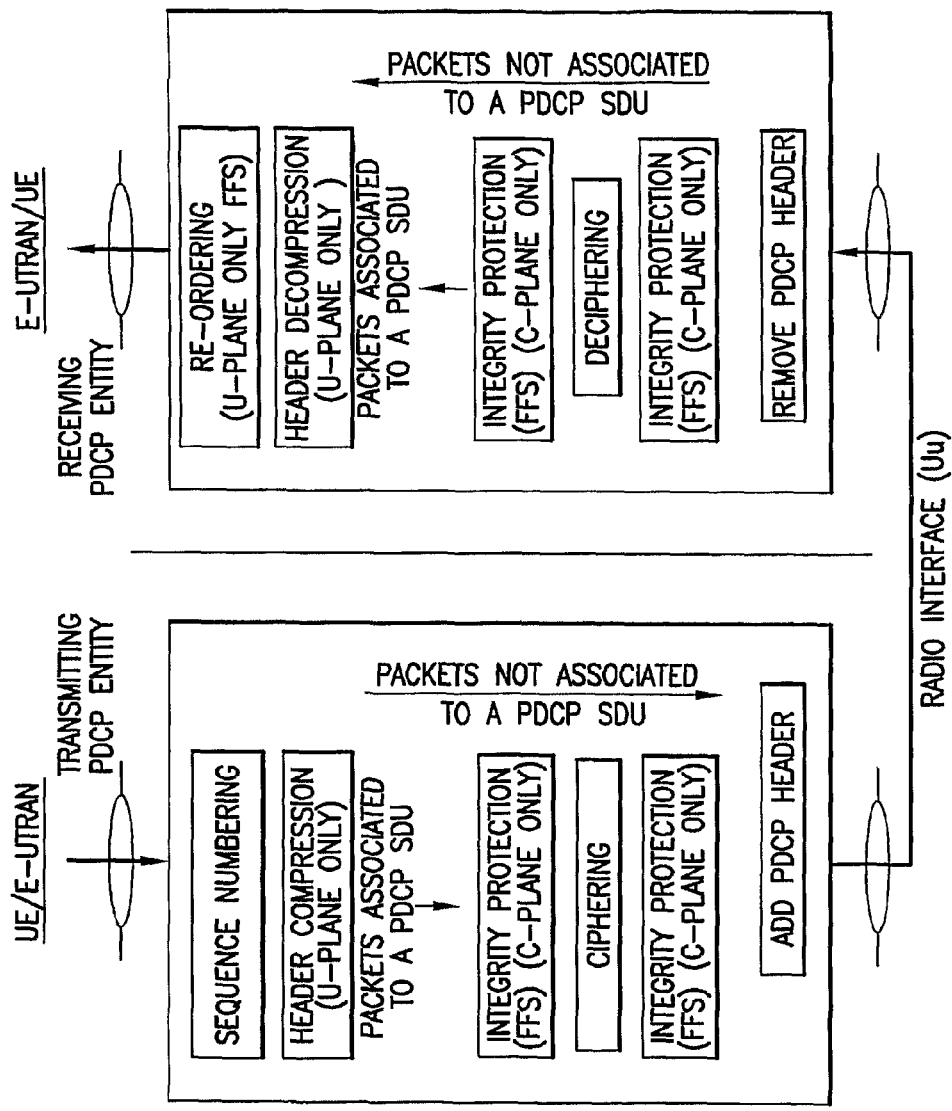
FIG. 5 is a diagram showing PDCP flows for uplink (left side) and downlink (right side).

In certain embodiments the described congestion control needs some control on the MME or higher level (PCRF) as well; it is desirable that the operator is able to define a minimum quality for voice. This could be implemented also as a UE specific feature so that customers who pay a higher rate could keep higher voice quality. In this case the rate control parameter messages would use the S1AP signaling interface (where AP indicates a message protocol such as message structure and information elements in the message). The exact structure of such a message can take many forms without departing from these teachings. For example, the rate control parameter message might carry information of the customer's priority or special privilege information (e.g., subscriber quality of service level) from which the e-NodeB bases the related radio bearers so as to implement the actual rate control. This is shown at FIG. 3 in the context of FIG. 2A; the PCRF provides the information to the MME (or S-Gateway of FIG. 2) which then stores for example the subscription levels for various users in the e-NodeB's cell, and the subscription levels give a minimum quality of service or bandwidth promised to the user via his subscription agreement. Some users pay for a higher quality or service than others, and so there will be different rate information for different users. The MME (or other higher node) provides this rate information to the PDCP of the e-NodeB such as in a rate control parameter message over the S1-U interface shown.

Using the new S1AP signaling, the operator is enabled to tune up the operation of this congestion control. The operator could e.g. disable the bit rate control or control the limits of AMR bit rates applied in the e-NodeB congestion control or control how the e-NodeB controls the bit rates of evolved packet system EPS radio bearers carrying AMR at worsening radio conditions (or any combination of these).

On particular implementation noted above would require new information (control) messages from the PCRF (some function in a higher level control element which distributes parameters controlling the e-NodeB's congestion or handling of AMR bit rates of UEs which are experiencing bad radio conditions prior to a handover) to the e-NodeB. See FIG. 3. Within the e-NodeB the information could go to the functional radio bearer RB control block (also termed the radio resource management RRM block) shown there. The UE priority information (the rate control parameter message) is a control message because it sets a limit below which the VoIP bearers for particular UEs may not be reduced. One possible implementation of the control information is to set a target VoIP bit rate value for the cell which has congestion. In the uncongested case there is no need for a specific bit rate, but the VoIP calls bit rate would just be restored to the value before bit rate control was started.

The RRM VoIP bit rate control messages may advantageously contain load information of the cells, and based on some set limits the PDCP then accesses control to the said VoIP bearers linked to the indicated cell. The actual control is done by changing the CMR values to either uplink, downlink or for both directions. The AMR at each peer node will then implement the required bit rate change.

In an embodiment, the actual control to the bit rates is done by using the CMR bits in the RTP header [see for example, a paper entitled "RTP Payload Format and File Storage Format for AMR and AMR-WB Audio Codecs", by J. Sjoberg et al. and designated Network Working Group RFC 3267 (June 2002)]. The change in bit rate is then implemented by the control function which controls the AMR codec. It can be included to the RTP or implemented as a separate multimedia control functionality. The PDCP changes the CMR bits of the stream to both directions at the same time, noting the present CMR's and codec modes. When two peer systems are both adjusting the bit rate, the lowest common bit rate is the one that is applied. This is compatible with the peer connected to circuit switched voice (e.g., GERAN or UTRAN).

So from the above, the clear advantage of this exemplary embodiment is to implement rate control so that network operators can control the overall VoIP bit rate and be able to have more VoIP calls (i.e. more voice call capacity) in the system at the expense of some degradation in voice quality. The implementations shown also make the AMR bit rate control more compatible with GSM and WCDMA systems.

Now a recurring idea in VoIP and LTE packet switching IP networks has been to keep the process content-agnostic, so that the nodes passing and otherwise handling the packets do so without 'opening' or otherwise exploring the content of the packets. But if this principle is kept very tight, it can cause additional complexity if there is also a requirement for some adaptivity to congestion situations in the system. If the concept of content-agnosticity is implemented in a very tight manner there would be need to implement application level control for AMR bit rates. On the other hand the content-agnosticity is already diminished, because the VoIP traffic is going to be distinguished from the data traffic in certain implementations. And further, the header compression functionality in PDCP has already broken the any tight requirements for content agnosticity between protocol layers. As a result of header compression inclusion to PDCP, it is also best suited to implement the manipulation of CMR bits. As it is a convergence protocol, it has all the necessary RTP header structure information available.

These teachings also improve VoIP call stability when the UE moves to the cell edge. The robustness of signaling is worst at the cell edge and when the IP packets are smaller, but the throughput in bad radiofrequency RF conditions is better. In the case of VoIP there are no automatic repeat-request ARQ level retransmissions and the problem is more severe than with IP packets which are not used for bearers with high real time requirements.

Figure 6:
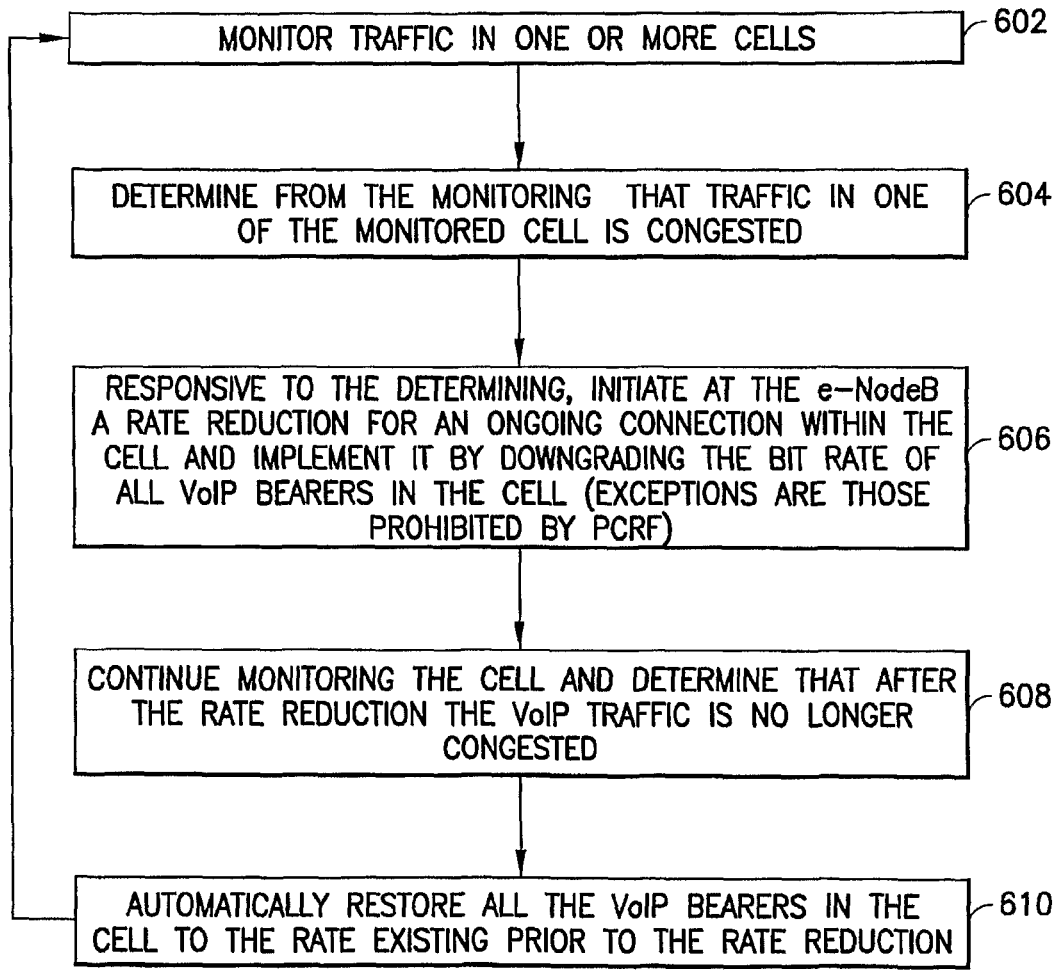
FIG. 6 is a flow diagram showing process steps undertaken by an access node/e-NodeB according to an embodiment of the invention.

As a summary of certain highlights of the above description, FIG. 6 is a process diagram that shows process steps that the e-NodeB may take in order to employ advantages according to these teachings. At block 602 the e-NodeB monitors traffic in one or more cells, which may be all traffic or only VoIP traffic. At block 604 the e-NodeB determines from the monitoring that traffic in one of the monitored cells is congested. Note that this may be a determination of actual or of anticipated/impending congestion. Responsive to the determining, at block 606 the e-NodeB initiates a rate reduction for ongoing connections within the cell, and according to one embodiment implements that rate reduction by downgrading/reducing the bit rate of all ongoing VoIP bearers in the cell. At some higher level there may be some signaling, such as through a S1 interface, that puts some constraints on how much and which ones of the UE's VoIP bearers can be bit rate reduced, as detailed above with respect to PCRF and the rate control parameter message. But the AMR rate adaptation itself is initiated and implemented by the e-NodeB. Rate reduction for most if not all of the VoIP connections in the cell that is congested makes available a significant amount of radio interface capacity. For the case where the bit rate is reduced for less than all of the VoIP bearers in the cell, those not reduced are allocated to UEs whose PCRF priority information prohibits the bit rate reduction. The e-NodeB continues monitoring the cell at block 608 and determines after the rate reduction that the cell is no longer congested, and so at block 610 all of the VoIP bearers in the cell are restored to the bit rate they used immediately prior to the bit rate reduction effected by the request of block 606.

From the above description it is apparent that embodiments of this invention include an apparatus such as a network element (e.g., e-NodeB or more generally network access node), a computer program embodied on a memory that may be disposed in the network element, and a method by which a network element monitors traffic in one or more cells, determines that traffic in one of the cells is congested (which includes anticipating that it will soon become congested), and responsive to the determining the network element initiates a rate change for at least one ongoing connection within the cell and implements a rate reduction in the cell. In short, VoIP packet traffic AMR rate in a cell is controlled by the access node's determination of congestion in the cell, and the determination can be the e-NodeB's estimate of congestion; rate adaptation is done by the e-NodeB by changing CMR bits in speech frame headers in PDCP. Some higher level signalling might also be used at the S1 interface (for LTE implementations).

In particular embodiments any of the various following aspects may be implemented individually or combined: The determining may be for all traffic in the cell, not just VoIP traffic; the ongoing connection may be an ongoing VoIP connection; where the rate change may be for all ongoing VoIP connections in the congested cell; where the rate change may downgrade a bit rate of all VoIP radio bearers in the congested cell; where the rate change may specify a bit rate that should be used in all VoIP connections within the cell; and thereafter automatically restoring all of the VoIP bearers to the bit rates existing prior to the rate reduction request after determining that the congested cell is no longer congested. In other particular embodiments, determining that traffic in the cell is congested uses PCRF priority information (e.g., received in a rate control parameter message), and initiating the rate change is implemented by the access node/e-NodeB configuring the PDCP to downgrade the bit rate for VoIP bearers in the cell; and for the case where the bit rate is not downgraded for all VoIP bearers in the cell, all VoIP bearers in the cell are reduced except those in use by UEs whose PCRF priority information prohibits a bit rate reduction.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

What is claimed is:

1. A method comprising:
   monitoring traffic in one or more cells;
   determining that the traffic in at least one of the cells is congested;
   receiving a rate control parameter message from an evolved packet core, and
   responsive to the determining, initiating a rate change, at an access node, for at least one ongoing connection within the cell in which traffic is congested, based at least in part on the monitored traffic and the received rate control parameter message,
   wherein initiating the rate change comprises changing codec mode request bits in speech frame headers in a packet data control protocol,
   wherein the rate control parameter message comprises information of customer's priority or information of special privilege.

2. The method according to claim 1, wherein the information of special privilege comprises subscriber quality of service level.

3. The method according to claim 1, wherein initiating the rate change further comprises reducing an adaptive multi-rate in the cell for only voice over interne protocol packet traffic.

4. The method according to claim 1, wherein initiating the rate change further comprises reducing a bit rate for at least one traffic in the cell.

5. The method according to claim 1, wherein initiating the rate change further comprises specifying a bit rate to be used in at least one voice over internet protocol connection within the cell.

6. The method according to claim 1, wherein initiating the rate change further comprises configuring a packet data control protocol to downgrade a bit rate for all voice over internet protocol bearers in the cell, except those bearers in use by a user equipment whose received priority information prohibits a bit rate reduction.

7. The method according to claim 1, where the rate control parameter message comprises the information of the customer's priority, and where the customer's priority sets a limit for the rate change.

8. An apparatus comprising:
   at least one processor; and
   at least one memory including computer program code
   the at least one memory and the computer program code configured to, with the at least one processor, cause the apparatus to perform at least the following:
   monitor traffic in one or more cells;
   determine that monitored traffic in at least a cell is congested;
   receive a rate control parameter message from an evolved packet core;
   and responsive to the determining, initiate a rate change, at an access node, for at least one ongoing connection within the cell in which traffic is congested, based at least in part on the monitored traffic and the received rate control parameter message,
   wherein initiating the rate change comprises changing codec mode request bits in speech frame headers in a packet data control protocol,
   wherein the rate control parameter message comprises information of customer's priority or information of special privilege.

9. The apparatus according to claim 8, wherein the special privilege information comprises subscriber quality of service level.

10. The apparatus according to claim 8, wherein the at least one memory and computer program code are further configured to, with the at least one processor, cause the apparatus at least to initiate the rate change by reducing an adaptive multi-rate in the cell for only voice over internet protocol packet traffic.

11. The apparatus according to claim 8, wherein the at least one memory and computer program code are further configured to, with the at least one processor, cause the apparatus at least to initiate the rate change comprises reducing a bit rate for all traffic in the cell.

12. The apparatus according to claim 8, wherein the at least one memory and computer program code are further configured to, with the at least one processor, cause the apparatus at least to initiate the rate change by specifying a bit rate that should be used in all voice over internet protocol connections within the cell.

13. The apparatus according to claim 8, wherein the at least one memory and computer program code are further configured to, with the at least one processor, cause the apparatus at least to restore automatically all the voice over internet protocol connections to a former bit rate existing prior to the specifying after the processor determines that the congested cell is no longer congested.

14. The apparatus according to claim 8, wherein the at least one memory and computer program code are further configured to, with the at least one processor, cause the apparatus at least to initiate the rate change by configuring a packet data control protocol to downgrade a bit rate for all voice over internet protocol bearers in the cell, excluding those bearers in use by a user equipment whose received priority information prohibits a bit rate reduction.

15. The apparatus according to claim 8, wherein the apparatus is part of an access node and the rate change that is initiated is constrained according to signaling received from the evolved packet core.

16. The apparatus according to claim 8, where the rate control parameter message comprises the information of the customer's priority, and where the customer's priority sets a limit for the rate change.

17. A non-transitory computer-readable medium bearing computer program code embodied therein for use with a computer, the computer program code comprising:
   code for monitoring traffic in one or more cells;
   code for determining that the traffic in at least one of the cells is congested;
   code for receiving a rate control parameter message from an evolved packet core; and
   code for, responsive to the determining, initiating a rate change for at least one ongoing connection within the cell in which traffic is congested based at least in part on the monitored traffic and the received rate control parameter message, wherein the code for initiating the rate change comprises code for changing codec mode request bits in speech frame headers in a packet data control protocol, wherein the rate control parameter message comprises information of customer's priority or information of special privilege.

18. The computer-readable medium according to claim 17, wherein the code for initiating the rate change further comprises code for reducing an adaptive multi-rate in the cell for only a voice over interne protocol packet traffic.

19. The computer-readable medium according to claim 17, wherein the code for initiating the rate change further comprises code for reducing a bit rate for all traffic in the cell.

20. The computer-readable medium according to claim 17, where the rate control parameter message comprises the information of the customer's priority, and where the customer's priority sets a limit for the rate change.

* * * * *